United States Patent [19]

Sumal

[11] 4,445,368
[45] May 1, 1984

[54] AIR FLOW RATE METER APPARATUS

[75] Inventor: Jaihind S. Sumal, Schwieberdingen, Fed. Rep. of Germany

[73] Assignee: Robert Bosch GmbH, Stuttgart, Fed. Rep. of Germany

[21] Appl. No.: 392,055

[22] Filed: Jun. 25, 1982

[30] Foreign Application Priority Data

Aug. 1, 1981 [DE] Fed. Rep. of Germany ....... 3130624

[51] Int. Cl.³ .......................... G01F 1/68; G01F 5/00
[52] U.S. Cl. .................................. 73/118.1; 73/203; 73/204
[58] Field of Search ................... 73/118 A, 202, 203, 73/204; 123/494

[56] References Cited

U.S. PATENT DOCUMENTS

| | | | |
|---|---|---|---|
| 1,304,920 | 5/1919 | Thomas | 73/204 |
| 3,559,492 | 2/1971 | Baker et al. | 73/202 |
| 4,381,668 | 5/1983 | Sato et al. | 73/204 |

FOREIGN PATENT DOCUMENTS 2065898  7/1981  United Kingdom ............ 73/118 A

Primary Examiner—Herbert Goldstein
Attorney, Agent, or Firm—Edwin E. Greigg

[57] ABSTRACT

A air flow rate meter apparatus includes an air bypass line, which branches off from a filter housing on the air intake fitting of an internal combustion engine and discharges at a restriction of the air intake tube upstream of a throttle valve. An injection valve is disposed in the restricted section, ejecting fuel in the direction toward a throttle valve. The air bypass line extends vertically and has a first U-shaped section, the connecting portion of which is located at a lower level than its legs. A temperature-dependent resistor in the form of a hot wire or hot strip is disposed in the downstream leg of the first U-shaped section, so that during a burnoff procedure of the temperature-dependent resistor a flow is effected in the direction toward the mouth of the air bypass line, thus preventing the aspiration of a fuel-air mixture into the air bypass line and thus avoiding the danger of ignition with the possible destruction of the temperature-dependent resistor.

5 Claims, 6 Drawing Figures

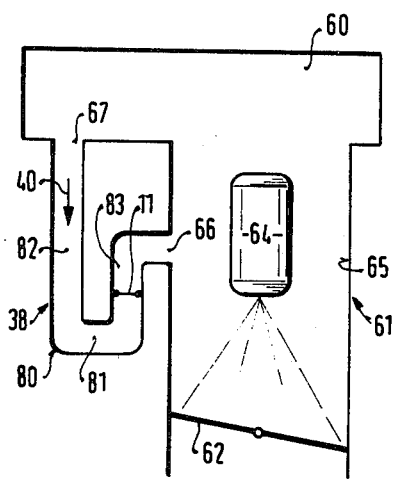
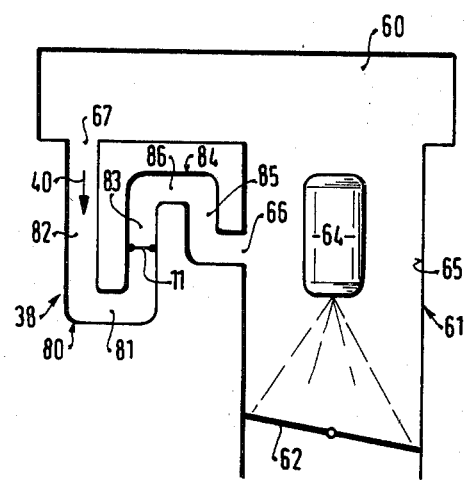
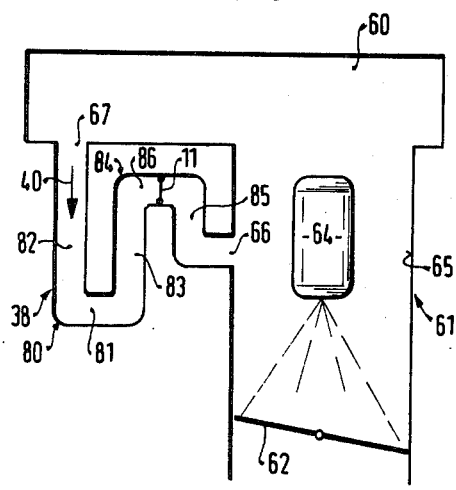
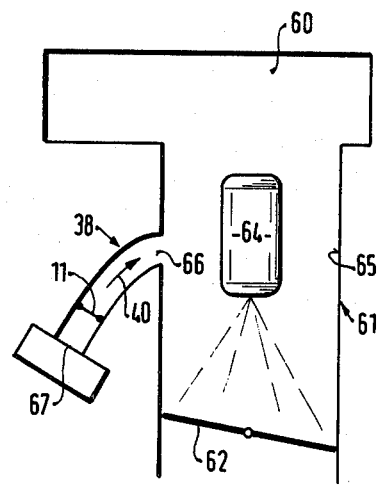

AIR FLOW RATE METER APPARATUS

BACKGROUND OF THE INVENTION

The present invention relates to an air flow rate meter apparatus including at least one temperature-dependent resistor whose temperature and/or resistance is regulated in accordance with the mass of flowing air and whose control variable represents a standard for the flowing air mass. An air flow conduit having a restriction is provided into which an air bypass line discharges. A mass of air flows through the air bypass line at a rate proportional to the mass of air flowing through the air flow conduit. An air flow rate meter, which includes the temperature-dependent resistor, is disposed in the air bypass line.

An air flow rate meter apparatus is already known in which the temperature-dependent resistor disposed in the air bypass line is brought to glow heat from time to time by means of an increased flow of electrical current, in order to burn off desirable deposits on the surface of the temperature-dependent resistor. In using such an air flow rate meter apparatus at the air intake tube of an internal combustion engine, a disadvantage exists in that during this burnoff process, because of the increase in the gases of combustion and the heated air from the air intake tube, a fuel-air mixture is aspirated which ignites at the glowing hot temperature-dependent resistor and causes an undesirable further increase in temperature at the temperature-dependent resistor. The result is not only the danger of fire but further glowing of the temperature-dependent resistor even after the burnoff process has ended, causing destruction of the temperature-dependent resistor.

OBJECT AND SUMMARY OF THE INVENTION

It is an object of the invention to provide an air flow rate meter apparatus which is safe from the danger of fire or from destruction of the temperature-dependent resistor caused by overheating.

This object is achieved by the present invention by embodying the air bypass line such that flow is restricted to the temperature-dependent resistor under predetermined operating conditions.

The air flow rate meter apparatus according to the present invention has the advantage over the prior art that during the burnoff process of the temperature-dependent resistor, a fuel-air mixture flow is prevented from reaching the temperature dependent resistor, so that the danger of a fire or of destruction of the temperature-dependent resistor caused by overheating is precluded.

The invention will be better understood and further objects and advantages thereof will become more apparent from the ensuing detailed description of preferred embodiment taken in conjunction with the drawings.

BRIEF DESCRIPTION OF THE DRAWINGS

FIG. 3 is a schematic illustration of a second exemplary embodiment of an air flow rate meter apparatus according to the invention;

FIG. 4 is a schematic illustration of a third exemplary embodiment of an air flow rate meter apparatus according to the present invention;

FIG. 5 is a schematic illustration of a fourth exemplary embodiment of an air flow rate meter apparatus according to the present invention; and FIG. 6 is a schematic illustration of a fifth exemplary embodiment of an air flow rate meter apparatus according to the present invention.

DESCRIPTION OF THE PREFERRED EMBODIMENT

Figure 1:
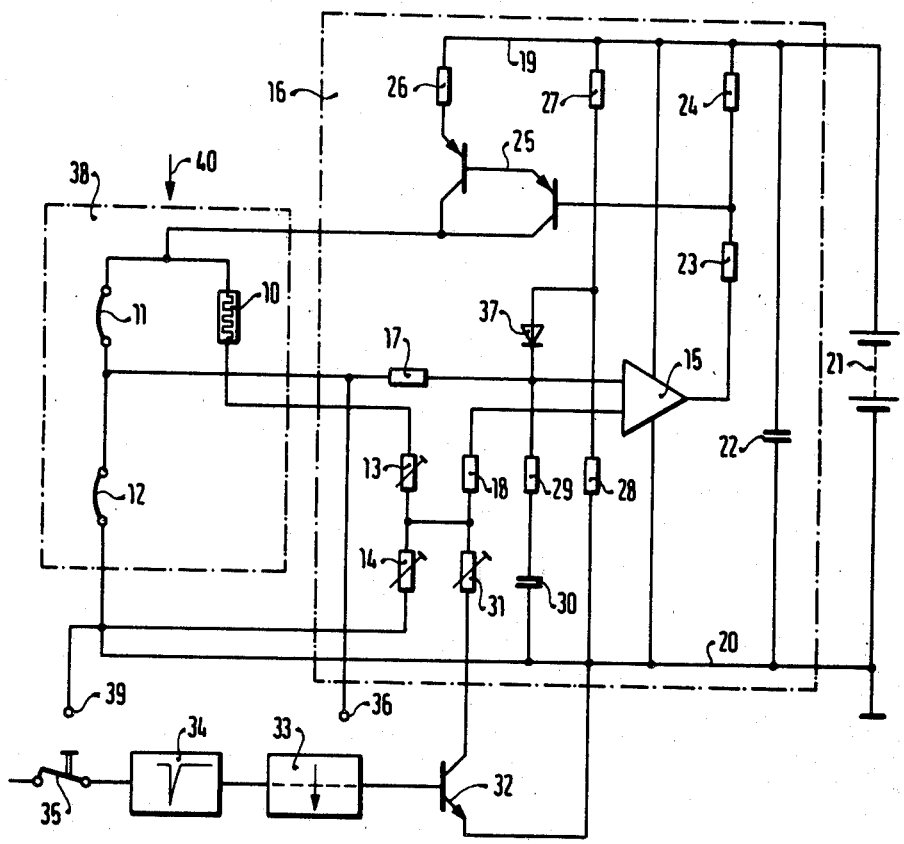
FIG. 1 is a circuit diagram of an air flow rate meter apparatus, intended in particular for measuring the mass of air aspirated by internal combustion engines.

In the circuit diagram shown in FIG. 1 for an apparatus for measuring the mass of a flowing medium, in particular for measuring the mass of air aspirated by internal combustion engines, a bridge circuit is provided comprising a temperature-dependent resistor 10, a temperature-dependent resistor 11, a resistor, 12, a resistor 13 and a resistor 14. A regulating amplifier 15 of a regulating device 16 is connected to the diagonal of the bridge circuit. The inverting input of the regulating amplifier 15 is connected via an input resistor 17 with the coupling point of the resistors 11 and 12, while the non-inverting input of the regulating amplifier 15 is connected via an input resistor 18 to the coupling point of the resistors 13 and 14. The regulating amplifier 15 is connected to supply lines 19 and 20 with a source of direct voltage 21. This direct voltage source 21 is switched in parallel to a smoothing capacitor 22. The output of the regulating amplifier 15 is connected with the series circuit of two resistors 23 and 24, the resistor 24 being connected to the common supply line 19. These two resistors 23 and 24 form a voltage divider for a Darlington circuit 25, which together with a resistor 26 forms a voltage-controlled current source for supplying current to the bridge circuit comprising the resistors 10, 11, 12, 13 and 14. A voltage divider comprising resistors 27 and 28 is switched between the common supply lines 19 and 20. The anode of a diode 37 is connected to the coupling point of resistors 27 and 28, and its cathode is connected with the inverting input of the regulating amplifier 15. The series circuit of a resistor 29 and a capacitor 30 is switched between the inverting input of the regulating amplifier 15 and the common supply line 20, and this resistor-capacitor combination serves the purpose of adapting the frequency of the regulating circuit to the time behavior of the temperature-dependent resistors. A resistor 31 is connected with the coupling point of the resistors 13 and 14 and can be connected via the switching path of the switching transistor 32 with the common supply line 20. The base of the switching transistor 32 is connected with the output of a monostable multivibrator 33, which is triggerable via a differentiation member 34 by an ignition switch 35 for the ignition system of the internal combustion engine, or by a pulse furnished by some other means.

The mode of operation of the described apparatus is as follows:

A specific current flows across the temperature-dependent resistor 11 of the bridge circuit and heats this resistor 11 up to its normal operating temperature. In another branch of the bridge, the temperature-dependent resistor 10 assumes a resistance value which characterizes the temperature of the flowing medium, for instance, the temperature of the air aspirated by the engine. As a result, the temperature of the air aspirated by the engine is always used as a reference signal for the regulation of the heating current performed by the apparatus. Depending upon the mass or flow rate of the aspirated air flowing past it, the temperature-dependent resistor 11 will cool down to a greater or lesser degree. This causes an imbalancing of the bridge circuit. This imbalance of the bridge circuit is eliminated in that the regulating amplifier 15 furnishes an increased supply current for the bridge circuit via the voltage-controlled current source 23, 24, 25 and 26, so that the temperature of the temperature-dependent resistor 11 and thus its resistance value are held to a value which is at least approximately constant. The current flowing through the bridge circuit is a standard for the quantity of air flowing in the direction of the arrow 40 past the temperature-dependent resistor 11. A corresponding electrical signal can be picked up between a terminal 36 and a terminal 39.

The voltage divider 27, 28, with the diode 37 serves to simplify the start-up of the regulating device 16. When the regulating device 16 is switched on, a voltage of approximately 0.5 V is brought about at the inverting input of the regulating amplifier 15, permitting reliable start-up of the regulating device. During normal operation, in contrast, the voltage at the inverting input of the regulating amplifier 15 will be substantially higher than this initial voltage, so that the diode 37 is blocked and thus no influence can be exerted on the regulating processes via the voltage divider 27, 28.

As will be described below, the temperature-dependent resistor 11, embodied as a hot wire or hot strip, must have deposits removed from its surface from time to time, and to this end an increased current is intended to flow across this temperature-dependent resistor 11 after a predetermined measuring cycle. An example of such a measuring cycle may be a predetermined length of operation of the internal combustion engine. The burnoff process could also be triggered each time the ignition system of the engine is switched off. This is effected when the ignition switch 35 is switched off. The corresponding signal is differentiated and directs the monostable multivibrator 33 to assume its unstable switching state. During this unstable switching state of the monostable multivibrator 33, the switching transistor 32 becomes conductive and switches the resistor 31 in parallel with the resistor 14 of the bridge circuit. As a result the bridge circuit comprising the resistors 10, 11, 12, 13 and 14 becomes severely imbalanced such that the regulating amplifier 15, in order to compensate for this imbalance, furnishes an increased current for the bridge circuit. This increased current heats the temperature-dependent resistor 11 for the duration of the unstable switching state of the monostable multivibrator 33 to a temperature which is above the normal operating temperature, so that residues on the surface of the temperature-dependent resistor 11 will burn off.

It has proved to be particularly advantageous for the material of the temperature-dependent resistor 11 to be structurally stabilized platinum, because this material is particularly well suited for being heated to high temperatures. This is particularly important for the burnoff process.

The reference resistor 12 is efficaciously also accomodated in the air bypass line, indicated by a dot-dashed line 38, bypassing the air intake tube of the engine, because then the lost heat of the reference resistor 12 can be carried away by the air flowing in the direction of the arrow 40. The resistors 13 and 14 are efficaciously embodied as adjustable resistors, so that the temperature behavior of the regulating circuit can be adjusted.

The air flow rate meter apparatus according to FIG. 1, is used in a fuel injection system, shown by way of example in FIGS. 2 through 6. In the fuel injection system shown in FIG. 2, the combustion air aspirated by the engine flows through an air filter 60 in the direction of the arrow into an air intake fitting 61, in which a throttle device embodied as a throttle valve 62 is disposed. As a result, the air intake tube 63 forming one flow conduit for the aspirated air is opened to a greater or lesser extent in the air intake fitting 61. Upstream of the throttle valve 62, an electromagnetic injection valve 64 is disposed concentrically with the air intake tube 63 in such a way that the ejected fuel reaches the opening gap formed between the throttle valve 62 and the air intake tube 63 is in a stream of conical shape.

The disposition of the injection valve 64 which may be provided with an oval lining in a manner not shown, forms a restricted section 65, in which the mouth 66 of the air bypass line 38 leading to the restriction 65 is disposed. The opening 67 of the air bypass line 38 is advantageously located on the air intake fitting downstream of the air filter 60. In order to ascertain the mass of air aspirated by the engine, the temperature-dependent resistor 11 embodied as a hot wire or hot strip is disposed in the air bypass line 38.

The supply of fuel to the electromagnetic injection valve 64 is effected by way of example by means of a fuel pump 70 driven by an electromotor 69. The pump 70 aspirates fuel from a fuel container 71 and delivers it via a fuel supply line 72 to the injection valve 64. A line 73 branches off from the fuel supply line 72 and has a pressure regulating valve 74 disposed in it, by way of which fuel can flow back to the fuel container 71.

In order to prevent a fuel-air mixture from being aspirated into the air bypass line 38 when the temperature-dependent resistor 11 is being burned free of deposits, the invention provides that the opening 67 of the air bypass line 38 should be closed by a closure flap 76 only during the burnoff process, which is shown schematically in the drawings. Thus, a flow in the air bypass line 38 is prevented and any combustion gases which may exist and cause possible ignition of a fuel-air mixture in that location are extinguished. The closure flap 76 could equally well be disposed at the mouth 66 of the air bypass line 38 or inside the air bypass line. The control of the closure flap 76 may be effected, by way of example, by an electromagnetic servomotor 77, which is triggered by the electronic regulating device 16 or by the vacuum of the intake tube, by way of a vacuum line 78.

Figure 2:
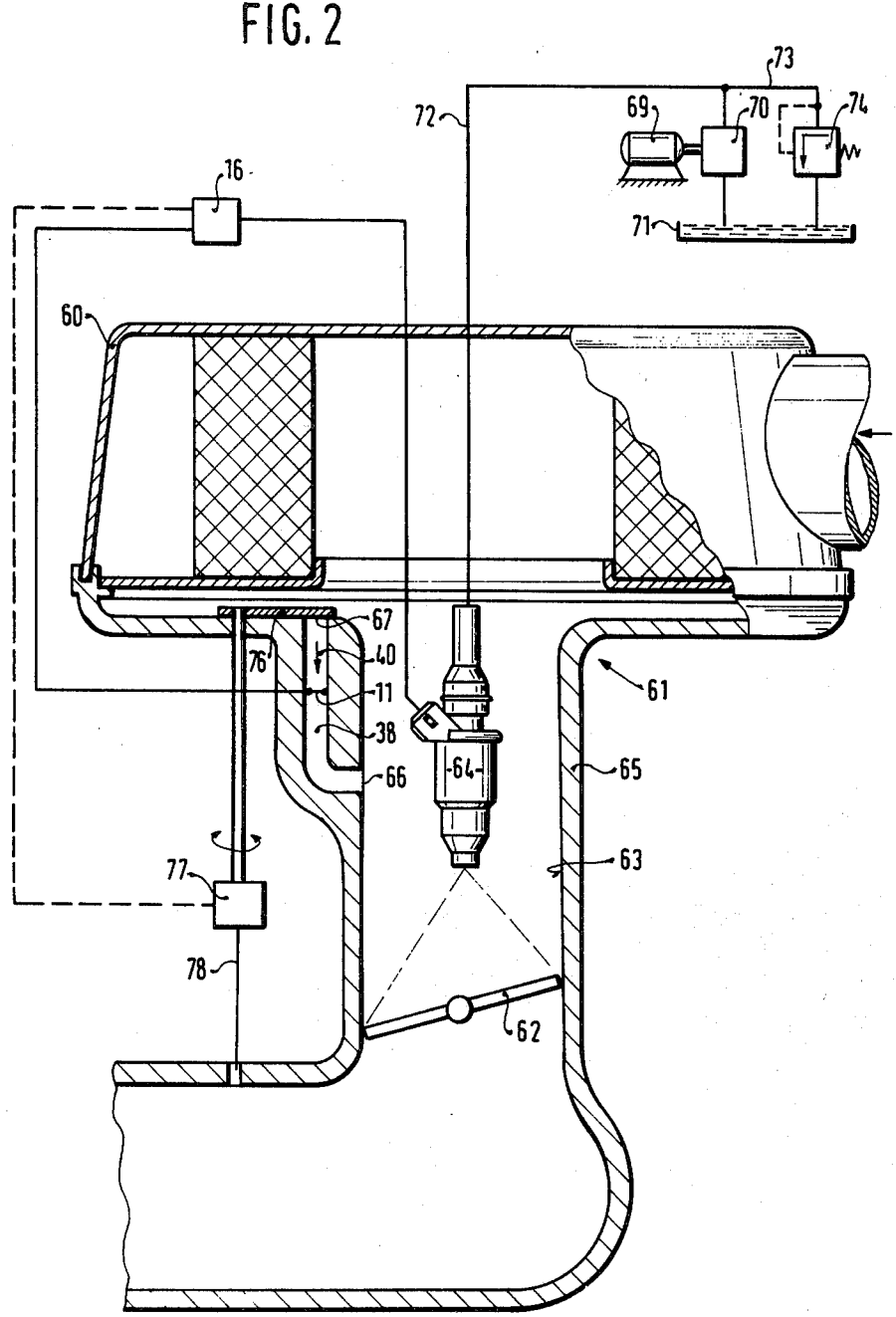
FIG. 2 is a section taken through an air intake fitting of an internal combustion engine with a first exemplary embodiment of an air flow rate meter apparatus according to the present invention.

In the exemplary embodiment of an air flow rate meter apparatus shown schematically in FIG. 3 and disposed at the air intake fitting 61 of the internal combustion engine, the same reference numerals are used as FIGS. 1 and 2 for elements which are the same. The air bypass line 38 extends vertically in the exemplary embodiment of FIG. 3 and has a U-shaped section 80 with a connecting portion 81, leg 82 located upstream of the connecting portion 81 and a leg 83 located downstream of the connecting portion 81. In accordance with the invention, the temperature-dependent resistor 11 of the air flow rate meter apparatus is disposed in the leg 83 of the U-shaped section 80, which communicates with the mouth 66. The U-shaped section 80 of the bypass line 38 is disposed such that the connecting portion 81 is lower in position than the legs 82, 83. During a burnoff process of the temperature-dependent resistor 11, any combustion gases which may have formed or any heated air will rise in the direction of the mouth 66, thus preventing the aspiration of the fuel-air mixture contained in the restriction 65.

In the exemplary embodiment FIG. 4, two U-shaped sections are provided. A second U-shaped section 84 follows the first U-shaped section 80 shown in FIG. 3. One leg of this second U-shaped secion 84 extends in common with the leg 83 of the first U-shaped section 80 and its second leg 85 leads to the mouth 66. The connecting portion 86 of the second U-shaped section 84 is located at a higher level than the connecting portion 81. In accordance with the invention, in this exemplary embodiment, the temperature-dependent resistor 11 is to be disposed in the common leg 83 of the first U-shaped section 80 and second U-shaped section 84, and again a flow takes place only in the direction of the mouth 66 in a burnoff process of the temperature-dependent resistor 11.

The exemplary embodiment of FIG. 5 differs from the exemplary embodiment of FIG. 4 solely in the location of the temperature-dependent resistor 11, which in the exemplary embodiment of FIG. 5 is disposed in the connecting 86 of the second U-shaped section 84. As a result, during the burnoff of the temperature-dependent resistor 11, any combustion gases which may be created will collect around the temperature-dependent resistor 11, thus preventing a further combustion process at the temperature-dependent resistor 11 and preventing a flow from the mouth 66 towards the temperature-dependent resistor 11.

In the further exemplary embodiment shown in FIG. 6, the air bypass line 38 is disposed vertically together with the temperature-dependent resistor 11, such that its mouth 66 is located at a higher level at the restriction 65 than is its opening 67. As a result, during a burnoff procedure for the temperature-dependent resistor 11, a flow towards the mouth 66 is brought about, preventing the aspiration of fuel-air mixture from the restriction 65.

The foregoing relates to preferred exemplary embodiments of the invention, it being understood that other embodiments and variants thereof are possible within the spirit and scope of the invention, the latter being defined by the dependent claims.

What is claimed and desired to be secured by Letters Patent of the United States is:

1. An air flow rate meter apparatus in an air intake of an internal combustion engine, comprising:
   an air flow conduit having a restriction;
   an air bypass line through which air flows which is at a predetermined proportion with respect to the mass of air flowing through the air flow conduit;
   an air flow rate meter device disposed within the air bypass line, said air flow rate meter device including at least one temperature-dependent resistor, wherein:
     at least one of temperature and resistance of said at least one temperature-dependent resistor is regulated in accordance with the mass of flowing air;
     the air bypass line includes a mouth which opens into the air flow conduit at its restriction, closure means which prevents a flow of air through the air bypass line mouth toward said at least one temperature-dependent resistor and
     a servomotor adjustable by means dependent on negative pressure for actuating said closure means wherein the air bypass line is closeable at one of its ends by said closure means.

2. An air flow rate meter apparatus, comprising:
   an air flow conduit having a restriction;
   an air bypass line through which air flows which is at a predetermined proportion with respect to the mass of air flowing through the air flow conduit;
   an air flow rate meter device disposed within the air bypass line, said air flow rate meter device including at least one temperature-dependent resistor, wherein:
     at least one of temperature and resistance of said at least one temperature-dependent resistor is regulated in accordance with the mass of flowing air;
     the air bypass line includes a mouth which opens into the air flow conduit at its restriction, and is embodied such that, at least under predetermined operating conditions, a flow of air through the air bypass line mouth toward said at least one temperature-dependent resistor is prevented;
     said air bypass line further includes a first U-shaped section having two legs and a connecting portion, further wherein:
       the air bypass line extends vertically;
       the connecting portion is located vertically lower than the two legs; and
       said at least one temperature-dependent resistor is disposed downstream of the connecting portion.

3. The air flow rate meter apparatus as defined in claim 2, wherein the air bypass line further includes a second U-shaped section disposed adjacent the first U-shaped section, the second U-shaped section having two legs and a connecting portion, further wherein:
   both U-shaped sections having a common leg;
   said at least one temperature-dependent resistor is disposed in said common leg;
   The connecting portion of the first U-shaped section being located vertically lower than the connecting portion of the second U-shaped section.

4. The air flow rate meter apparatus as defined in claim 2 wherein the air bypass line further includes a second U-shaped section disposed adjacent the first U-shaped section, the second U-shaped section having two legs and a connecting portion, further wherein:
   said at least one temperature-dependent resistor is disposed in the connecting portion of the second U-shaped section, which is located downstream relative to said first U-shaped section; and
   the connecting portion of the first U-shaped section being located vertically lower than the connecting portion of the second U-shaped section.

5. An air flow rate meter apparatus, comprising:
   an air flow conduit having a restriction;
   an air bypass line through which air flows which is at a predetermined proportion with respect to the mass of air flowing through the air flow conduit;
   an air flow rate meter device disposed within the air bypass line, said air flow rate meter device including at least one temperature-dependent resistor, wherein:
     at least one of temperature and resistance of said at least one temperature-dependent resistor is regulated in accordance with the mass of flowing air;
     the air bypass line includes a mouth which opens into the air flow conduit at its restriction, and is embodied such that, at least under predetermined operating conditions, a flow of air through the air bypass line mouth toward said at least one temperature-dependent resistor is prevented, and
   said air bypass line extends vertically such that its end opposite to said mouth is located vertically lower than said mouth.

* * * * *